(12) United States Patent
Rodriguez et al.

(10) Patent No.: US 7,770,070 B2
(45) Date of Patent: Aug. 3, 2010

(54) TEST AUTOMATION VIA RFID TECHNOLOGY

(75) Inventors: Alberto Rodriguez, Webster, NY (US); Heiko Rommelmann, Penfield, NY (US); Steven T. Reczek, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 400 days.

(21) Appl. No.: 11/766,360

(22) Filed: Jun. 21, 2007

(65) Prior Publication Data

US 2008/0320335 A1 Dec. 25, 2008

(51) Int. Cl.
*G06F 11/00* (2006.01)
(52) U.S. Cl. ............................... 714/46; 714/45
(58) Field of Classification Search ............... 714/1–57; 358/1.15; 715/705; 340/10.1
See application file for complete search history.

(56) References Cited

U.S. PATENT DOCUMENTS

| | | | |
|---|---|---|---|
| 6,032,004 | A | 2/2000 | Mirabella, Jr. et al. |
| 6,195,006 | B1 | 2/2001 | Bowers et al. |
| 7,222,255 | B1 * | 5/2007 | Claessens et al. ............ 714/4 |
| 2005/0167024 | A1 | 8/2005 | Sanzone et al. |
| 2006/0082446 | A1 | 4/2006 | Dods |
| 2006/0179348 | A1 * | 8/2006 | Florissi et al. ................ 714/30 |
| 2006/0179391 | A1 | 8/2006 | Rodriguez et al. |
| 2006/0202705 | A1 * | 9/2006 | Forster ........................ 324/750 |
| 2006/0206277 | A1 * | 9/2006 | Horch ........................... 702/82 |
| 2006/0208079 | A1 * | 9/2006 | Chang et al. ................. 235/451 |
| 2006/0255941 | A1 * | 11/2006 | Carrender et al. ........ 340/572.1 |
| 2006/0265742 | A1 | 11/2006 | Rommelmann et al. |
| 2007/0069856 | A1 * | 3/2007 | Lee ........................... 340/10.1 |
| 2007/0083381 | A1 | 4/2007 | Farrell et al. |
| 2007/0096917 | A1 | 5/2007 | Yang |
| 2007/0113966 | A1 | 5/2007 | Eckstein et al. |
| 2008/0010535 | A1 * | 1/2008 | Dasgupta ..................... 714/38 |
| 2008/0144083 | A1 * | 6/2008 | Powers et al. .............. 358/1.15 |

* cited by examiner

*Primary Examiner*—Scott T Baderman
*Assistant Examiner*—Sarai Butler
(74) *Attorney, Agent, or Firm*—Gibb I.P. Law Firm, LLC

(57) ABSTRACT

A method and system receives test requirements and test settings in order to design a test. An identifier is assigned to the test that was designed and the test is stored in a database using the identifier to identify the test. In addition, the test is printed on at least one sheet or form and a wireless read/write device is programmed with the identifier assigned to the test. The wireless read/write device is attached to the sheet on which the test was printed. Thus, the sheet and the wireless read/write device can be provided to a test operator to allow the test operator to wirelessly read the identifier from the wireless read/write device. Then, the test operator can access the test from the database based on the identifier read from the wireless read/write device. The test instructions (comprising the test requirements and test settings) are provided from the database to the operator to perform the test and potentially produce a physical test output. The test instructions are provided to the operator through a graphic user interface.

20 Claims, 3 Drawing Sheets

TEST AUTOMATION VIA RFID TECHNOLOGY

BACKGROUND AND SUMMARY

Embodiments herein generally relate to systems, methods, services, etc. for testing products and more particularly to using a wireless read/write device (attached to a test form) to reference a stored test within a database and to record testing information within the read/write device during or after the test.

Currently the majority of the test processes are carried out by hand. In one example of testing the output of a printing/copying device for validation of image quality and performance of customer replaceable units (CRU's) such as rollers, fusers, ink/toner cartridges, etc., the tests are carried out by hand. That is, a quality control engineer designs a test and documents the test. The document containing the test is then printed and handed to a key operator who reads it and enters settings into the test printing/copying machine accordingly (for example, the test can set non-volatile memory (NVM)). In the case of image analysis, test patterns are downloaded to the test machine from a database manually by the test operator, and test print sets are made.

During the testing process, the key operator has to document any comments and observations by writing on a pre-printed form. As portions of the test are completed data is collected manually by entering diagnostic modes and reading NVM values which are transcribed to the preprinted forms. The data is later entered by hand from the form into a database for information sharing and analysis. The process is tedious and also prone to error because, at several steps, information is transcribed from/to visual displays or from one form to another by hand. Because of data entry errors some tests have to be repeated as the integrity of the test cannot be established.

In light of these issues, this disclosure presents a method and system that receives test requirements and test settings in order to design a test. An identifier is assigned to the test that was designed, and the test is stored in a database using the identifier to identify the test. In addition, the test is printed on at least one sheet or form and a wireless read/write device is programmed with the identifier assigned to the test. The wireless read/write device comprises a radio frequency identification (RFID) device, such as a self-adhesive RFID device adapted to be applied to the sheet. The wireless read/write device is attached to or printed on the sheet on which the test was printed.

Thus, the sheet and the wireless read/write device can be provided to a test operator to allow the test operator to wirelessly read the identifier from the wireless read/write device. Then, the test operator can access the test from the database based on the identifier read from the wireless read/write device. The test instructions (comprising the test requirements and test settings) are provided from the database to the operator to perform the test and potentially produce a physical test output. The test instructions are provided to the operator through a graphic user interface.

During and/or after performing the test, the method electronically stores the test results and any test operator remarks in the database using the identifier. The same information is also stored in the wireless read/write device. Further, the test results and test operator remarks are also marked (automatically or manually) on the sheet. Then, the sheet, the wireless read/write device, and the physical test output can be physically stored together in physical storage (an archive).

The printing of the sheet and the programming of the wireless read/write device can be performed at the testing location or a second location positioned away from (non-adjacent to) the testing location. Further, during and/or after performing the test, the operator can verify whether the test results match expected test results. The method can also record a test operator identification, a test device identifier, a test start time, and a test finish time in the database using the identifier and the same can be stored in the wireless read/write device.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The embodiments herein provide processes, systems, services, computer programs, etc. for testing products and more particularly to using a wireless read/write device (attached to a test form) to reference a stored test within a database and to record testing information within the read/write device during or after the test.

Figure 1:
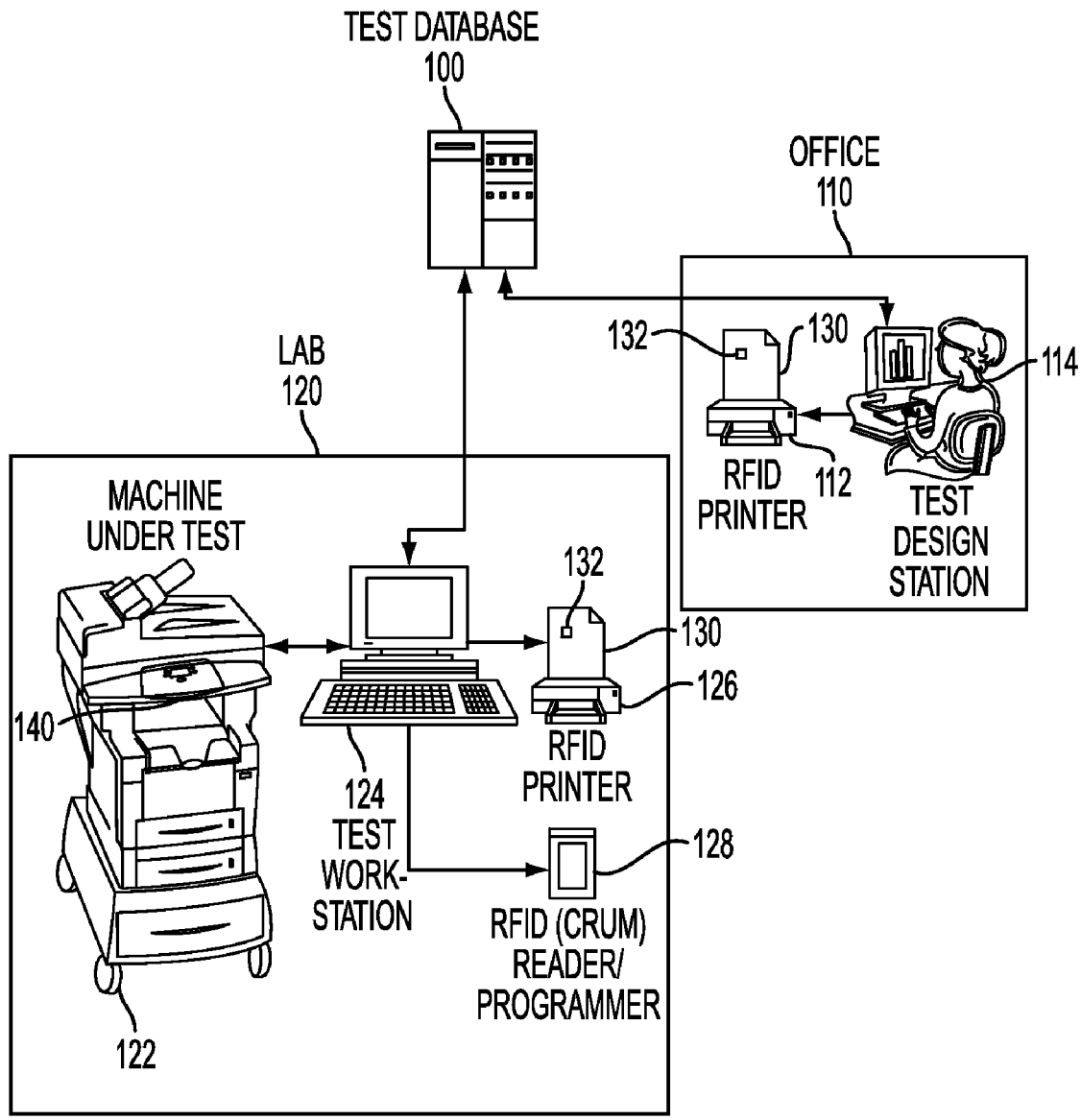
FIG. 1 is a schematic representation of a system embodiment herein.

This disclosure addresses common testing situations using a system of hardware and software elements, as shown in FIG. 1, including a test database 100 and radio frequency identification (RFID) tags 132 attached to test forms 130, with the purpose of automating performance and quality control tests for consumer replaceable units (CRU's) during the design, domestication and/or cost-down phases.

Customer replaceable units 140 that are located within the test machine 122 include any common consumption element of a device. In the case of printers/copiers, these can include items such as rollers, fusers, ink/toner cartridges, etc. Further, these CRU's can include a memory and can be referred to as customer replaceable units with memory (CRUM). Also, such CRUM's 140 can comprise hybrids, because they have the ability to operate through wired connections and wireless connections (RFID) as shown in FIG. 1.

Although IQA (Image Quality Analysis) as applied to CRU's are used as examples to explain the embodiments herein, the concepts disclosed herein are not limited to these examples, and instead are applicable to any device that needs to be tested including new products being developed and manufactured, old products being serviced, new and old parts being manufactured/serviced, etc.

The embodiments herein use RFID tags 132 attached to printed test forms 130 as a means to close the gap between the various steps of the process to enable electronic information sharing and the potential for increased test automation. An additional feature of embodiments herein is that the data of interest and set points used for the tests (i.e. print count, pixel usage, CRU Mfg. date, charging device offset value, etc.) are stored in the CRUM 140. Therefore, as shown in FIG. 1, it is not necessary to access the memory of the machine 122 used to perform the test through a diagnostic mode, but instead the embodiments herein can program the test requirements into CRUM values directly using a RFID reader/programmer 128 and read the values in the CRUM 140 as they are updated by the machine 122 during the test.

As depicted in FIG. 1, the test is designed at the engineer's personal computer (PC) by means of a software application, shown as the test design station 114 at an office 110. After the test design is completed, the test settings are uploaded to the database 100 and a unique number/string identifier is assigned to the test in the database 100. This identifier is used at the test workstation 124 to query the test parameters from the database 100.

The software running at the test design station 114 has the capability also of printing the test settings to a form 130 and programming an RFID label 132 affixed to the same with this unique identifier using a printer 112 local to the office 110. Alternatively, the form 130 and RFID label 132 can be printed to a remote location such as the lab 120 using a printer 126 in the lab. Thus, the printing of the sheet and the programming of the wireless read/write device can be performed at the testing location or a second location positioned away from (non-adjacent to) the testing location. The different locations can be in different rooms in the same building, in different buildings, in different cities, states, countries, etc.

Figure 2A:
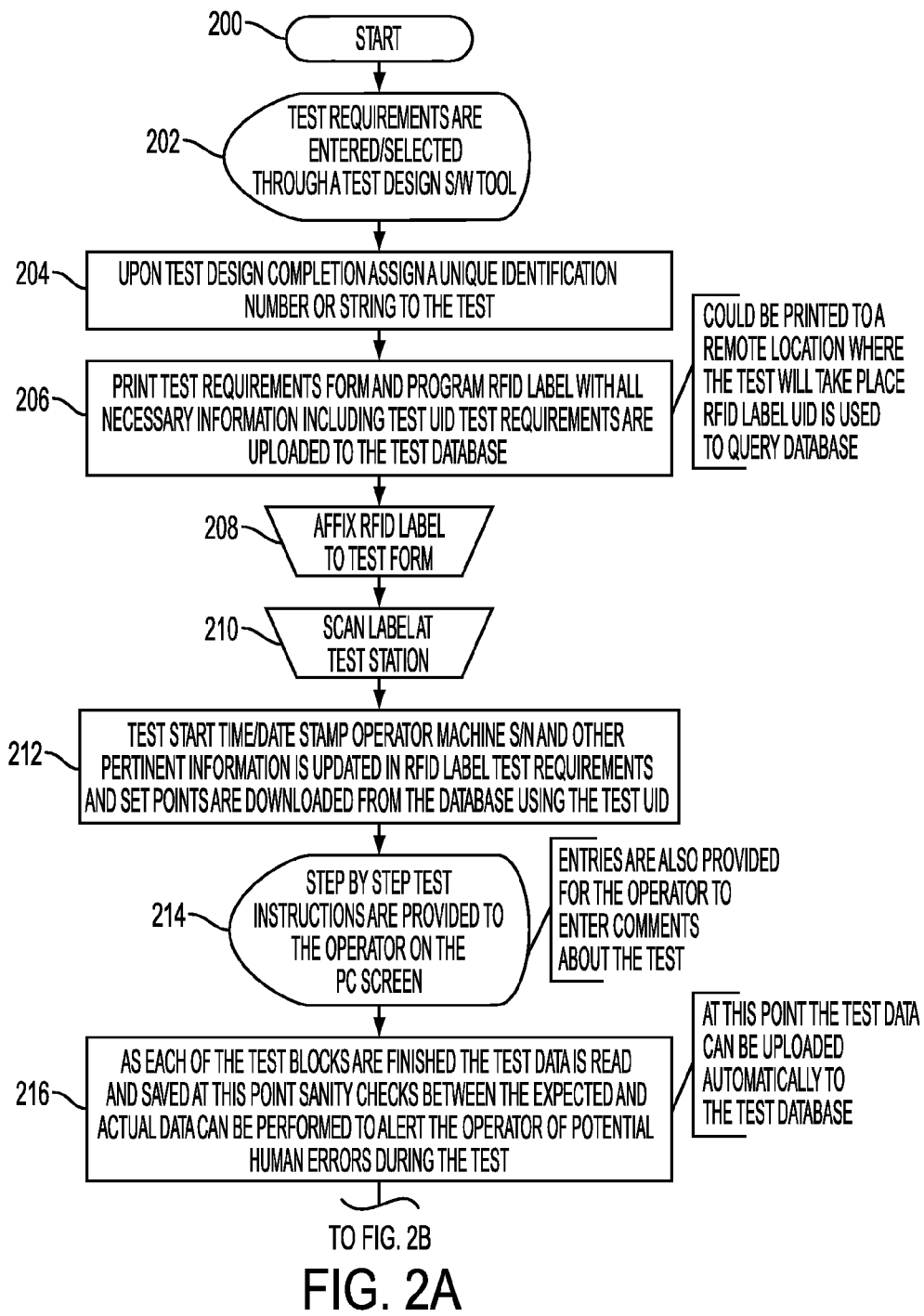
FIGS. 2A and 2B are a flow diagram illustrating embodiments herein.
Figure 2B:
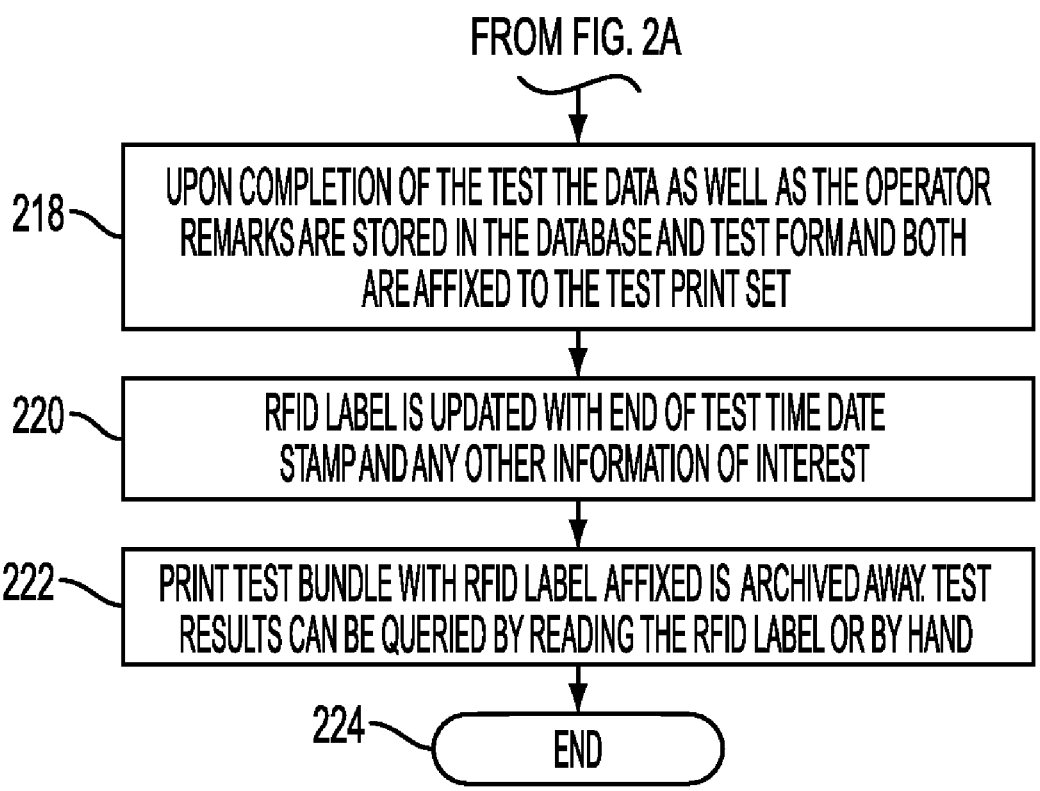

Thus, as shown in flowchart form in FIGS. 2A and 2B, this disclosure presents a method and system that starts in item 200 and receives test requirements and test settings at the test design station 114 in order to design a test in item 202. An identifier (Unique Identifier (UID)) is assigned (in item 204) to the test that was designed in item 202 and the test is stored in the database 100 using the identifier to identify the test. In addition, in item 206, the test is printed on at least one sheet or test form 130 and a wireless read/write device 132 is programmed with the identifier assigned to the test.

The wireless read/write device 132 comprises a radio frequency identification (RFID) device, such as a self-adhesive RFID device adapted to be applied to the sheet 130. Alternatively, the RFID devices 132 can be printed on the sheet 130 using RFID printing processes, such as those described in U.S. Patent Publications 2007/0113966, and 2007/0096917, the complete disclosures of which are incorporated herein by reference. The wireless read/write device 132 is attached to or printed on the sheet 130 on which the test was printed in item 208. The test sheets 130 can have permanent RFID tags 132 imbedded within the material of the sheet 130 (see U.S. Patent Publication 2007/0083381, incorporated herein by reference), or the tags 132 can be attached to the sheets 130 before or after the sheets 130 are printed and/or before or after the RFID tags 132 are programmed with the test identifier. The RFID tags 132 can be attached by adhesives, tapes, bonding material, clips, pouches, or any other form of attachment device to the sheets 130.

Once in the lab 120 the RFID label 132 is scanned using the same reader/programmer 128 that is used to read and program the RFID CRUM 140 that is located within the test machine 122, as shown by item 210. Thus, the sheet 130 and the wireless read/write device 132 can be provided to a test operator to allow the test operator to allow the test operator to wirelessly read the identifier from the wireless read/write device. Also at this time, as shown in item 212, the test start time/date stamp, operator identifier, machine serial number, and other pertinent information can be updated in the RFID label 132.

Then, the test operator can access the test (or the test can be automatically provided) from the database based on the identifier read from the wireless read/write device. Thus, in item 214, the test instructions (comprising the test requirements and test settings) are provided from the database 100 automatically to the operator to perform the test and potentially produce a physical test output. For example, in the case of testing a CRU within a printer/copier, test prints would be output as physical test output as part of the testing process. The test instructions are provided to the operator through the graphic user interface of the test workstation 124 located in the lab 120. In addition, the graphic user interface 124 allows the operator to enter comments about the test. At this point, if necessary, the application gives the option to the operator to program the CRU tags (CRUMs) 140 to the appropriate settings for the test. Once this is done the test starts.

As shown in item 216, at various points during the test, the operator is instructed (through the graphic user interface 124) to signal the application when the particular step is completed so that the application can collect the CRUM 140 data. Alternatively, this step can be automated. The machine under test 122 can be fitted with the appropriate hardware to allow the test workstation to collect the CRUM 140 data or the CRUM 140 can comprise a hybrid RFID device that can be communicated with wirelessly.

As the CRUM data is collected in item 216, the test operator can be instructed to perform "sanity checks" to validate the integrity of the data. Thus, for example, if 100 prints were to be made during a given test or test portion, the value of the Print Count field of the CRUM will be checked to insure it was incremented by the correct number. In other words, during and/or after performing the test, the operator can verify whether the test results match expected test results. If an anomaly is detected a corresponding message will be presented on the screen and recorded and logged. All information is stored in the database during the test.

As shown in item 218, during and/or after performing the test, the method electronically stores the test results and any test operator remarks in the database 100, using the identifier, and in the CRUM 140. As shown in item 220, the same information is also stored in the wireless read/write device 132 along with items of information such as the test operator identification, a test device identifier, a test start time, a test finish time, etc. Further, the test results and test operator remarks are also marked (automatically or manually) on the sheet 130. Thus, the test operator can hand write remarks on the sheet 130 or can print the remarks on the sheet 130 using the printer 126. Then, as shown in item 222 the sheet, the wireless read/write device, the physical test output, and the CRU can be physically stored together (bundled) and placed in physical storage (an archive). This allows the test results to be queried from the database manually or by simply reading the RFID label. The process ends in item 224.

Various CRU and RFID devices are discussed herein. RFID devices, programmers, scanners, etc. are readily available from manufacturers such as Intermec Technologies Corporation, Everett, Wash., USA, and TEK, Industries, Inc., Vernon, Conn., USA. See also U.S. Patent Publications 2006/0082446 and 2005/0167024 (incorporated herein by reference) for a discussion of applying RFID tags. CRU devices are discussed in U.S. Patent Publications 2006/0265742, 2006/0179391 and U.S. Pat. No. 6,195,006 the complete disclosures of which are incorporated herein by reference. The details of such items are omitted herefrom to allow the reader to focus on the salient aspects of the embodiments described herein.

Additionally, various computerized devices are mentioned herein. Computers that include input/output devices, memories, processors, antenna, programmable controllers, etc. are readily available devices produced by manufactures such as International Business Machines Corporation, Armonk N.Y., USA and Apple Computer Co., Cupertino Calif., USA. Such chips, antenna, switches, etc. commonly include input/output devices, power supplies, processors, electronic storage memories, wiring, etc., the details of which are omitted herefrom to allow the reader to focus on the salient aspects of the embodiments described herein.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA. Such printers commonly include input/output, power supplies, processors, media movement devices, marking devices etc., the details of which are omitted herefrom to allow the reader to focus on the salient aspects of the embodiments described herein.

Thus, as shown above, this disclosure presents a method and system that receives test requirements and test settings in order to design a test. An identifier is assigned to the test that was designed, and the test is stored in a database using the identifier to identify the test. In addition, the test is printed on at least one sheet or form and a wireless read/write device is programmed with the identifier assigned to the test. The wireless read/write device is attached to the sheet on which the test was printed.

Thus, the sheet and the wireless read/write device can be provided to a test operator to allow the test operator to wirelessly read the identifier from the wireless read/write device. Then, the test operator can access the test from the database based on the identifier read from the wireless read/write device. The test instructions are provided from the database to the operator to perform the test and potentially produce a physical test output. The test instructions are provided to the operator through a graphic user interface, operatively connected to the database.

During and/or after performing the test, the method electronically stores the test results and any test operator remarks in the database using the identifier. The same information is also stored in the wireless read/write device. Further, the test results and test operator remarks are also marked (automatically or manually) on the sheet. Then, the sheet, the wireless read/write device, and the physical test output can be physically stored together in physical storage (an archive).

This system and method enhances the level of automation of an otherwise labor intensive activity. Further, with embodiments herein, data integrity is protected against human error and savings are realized by minimization of test repetition due to human error, which provides more efficient use of resources.

All foregoing embodiments are specifically applicable to electrostatographic and/or xerographic machines and/or processes as well as to software programs stored on the electronic memory (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
   electronically storing a test in a database using an identifier;
   printing said test on at least one sheet;
   programming a wireless read/write device with said identifier assigned to said test;
   physically attaching said wireless read/write device to said sheet;
   wirelessly reading said identifier from said wireless read/write device;
   accessing said test from said database based on said identifier read from said wireless read/write device;
   performing said test by directly programming, via said wireless read/write device, individual test requirements into memory within customer replaceable items, and reading, via said wireless read/write device, values in said memory within customer replaceable items as said values are updated during said test to produce a physical test output; and
   at least one of during and after performing said test, electronically storing test results and test operator remarks in said database, using said identifier, and in said wireless read/write device.

2. The method according to claim 1, further comprising, during and after performing said test, verifying whether said test results match expected test results.

3. The method according to claim 1, further comprising recording a test operator identification, a test device identifier, a test start time, and a test finish time in said database using said identifier and in said wireless read/write device.

4. The method according to claim 1, wherein said test instructions are provided to said operator through a graphic user interface.

5. The method according to claim 1, wherein said wireless read/write device comprises a radio frequency identification (RFID) device.

6. The method according to claim 1, wherein said wireless read/write device comprises a self-adhesive radio frequency identification (RFID) device adapted to be applied to said sheet.

7. The method according to claim 1, wherein said printing of said sheet and said programming of said wireless read/write device is performed at one of a testing location and a second location positioned non-adjacent to said testing location.

8. A method comprising:
   assigning an identifier to a test;
   electronically storing said test in a database using said identifier;
   printing said test and physically attaching a wireless read/write device on at least one sheet;
   programming said wireless read/write device with said identifier assigned to said test;
   providing said sheet and said wireless read/write device to a test operator;
   wirelessly reading said identifier from said wireless read/write device;
   accessing said test from said database based on said identifier;
   providing test instructions from said database to said operator;
   performing said test by directly programming, via said wireless read/write device, individual test requirements into memory within customer replaceable items, and reading, via said wireless read/write device, values in said memory within customer replaceable items as said values are updated during said test to produce a physical test output; and
   at least one of during and after performing said test, electronically storing test results and test operator remarks in said database using said identifier and in said wireless read/write device, and marking said test results and test operator remarks on said sheet.

9. The method according to claim 8, further comprising, during and after performing said test, verifying whether said test results match expected test results.

10. The method according to claim 8, further comprising recording a test operator identification, a test device identifier, a test start time, and a test finish time in said database using said identifier and in said wireless read/write device.

11. The method according to claim 8, wherein said test instructions are provided to said operator through a graphic user interface.

12. The method according to claim 8, wherein said wireless read/write device comprises a radio frequency identification (RFID) device.

13. The method according to claim 8, wherein said wireless read/write device comprises a self-adhesive radio frequency identification (RFID) device adapted to be printed on said sheet.

14. The method according to claim 8, wherein said printing of said sheet and said programming of said wireless read/write device is performed at one of a testing location and a second location positioned non-adjacent to said testing location.

15. A method comprising:
   receiving test requirements and test settings to design a test;
   assigning an identifier to said test;
   electronically storing said test in a database using said identifier;
   printing said test on at least one sheet;
   programming a wireless read/write device with said identifier assigned to said test;
   physically attaching said wireless read/write device to said sheet;
   providing said sheet and said wireless read/write device to a test operator;
   wirelessly reading, by said test operator, said identifier from said wireless read/write device;
   accessing, by said test operator, said test from said database based on said identifier;
   providing test instructions comprising said test requirements and test settings from said database to said operator;
   performing said test by directly programming, via said wireless read/write device, individual test requirements into memory within customer replaceable items, and reading, via said wireless read/write device, values in said memory within customer replaceable items as said values are updated during said test to produce a physical test output;
   at least one of during and after performing said test, electronically storing test results and test operator remarks in said database using said identifier and in said wireless read/write device, and marking said test results and test operator remarks on said sheet; and
   physically storing said sheet, said wireless read/write device, and said physical test output together in physical storage.

16. The method according to claim 15, further comprising, during and after performing said test, verifying whether said test results match expected test results.

17. The method according to claim 15, further comprising recording a test operator identification, a test device identifier, a test start time, and a test finish time in said database using said identifier and in said wireless read/write device.

18. The method according to claim 15, wherein said test instructions are provided to said operator through a graphic user interface.

19. The method according to claim 15, wherein said wireless read/write device comprises a radio frequency identification (RFID) device.

20. The method according to claim 15, wherein said wireless read/write device comprises a self-adhesive radio frequency identification (RFID) device adapted to be applied to said sheet.

* * * * *